US008405927B2

(12) United States Patent
Che et al.

(10) Patent No.: US 8,405,927 B2
(45) Date of Patent: Mar. 26, 2013

(54) APPARATUS AND METHOD FOR DETECTING LOW FLYING SLIDERS

(75) Inventors: Xiaodong Che, Saratoga, CA (US); Xiao Z. Wu, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 1268 days.

(21) Appl. No.: 11/542,354

(22) Filed: Oct. 2, 2006

(65) Prior Publication Data

US 2008/0080086 A1 Apr. 3, 2008

(51) Int. Cl.
*G11B 21/02* (2006.01)
*G11B 27/36* (2006.01)

(52) U.S. Cl. ............................. 360/75; 360/31
(58) Field of Classification Search ............. None
See application file for complete search history.

(56) References Cited

U.S. PATENT DOCUMENTS

| 5,594,595 | A | | 1/1997 | Zhu |
| 6,000,282 | A | * | 12/1999 | Ku et al. ..................... 73/105 |
| 6,092,412 | A | * | 7/2000 | Flechsig et al. ................. 73/105 |
| 6,164,118 | A | * | 12/2000 | Suzuki et al. ................... 73/1.89 |
| 6,195,219 | B1 | * | 2/2001 | Smith ............................. 360/66 |
| 6,293,135 | B1 | | 9/2001 | Marchon et al. |
| 6,570,730 | B1 | | 5/2003 | Lewis et al. |
| 6,717,763 | B2 | * | 4/2004 | Ottesen et al. ................... 360/75 |
| 6,859,996 | B1 | * | 3/2005 | Slife et al. .................. 29/603.03 |
| 7,009,800 | B2 | * | 3/2006 | Yang ............................... 360/75 |
| 2001/0035960 | A1 | | 11/2001 | Johnston |
| 2003/0218813 | A1 | | 11/2003 | Dakroub |
| 2004/0135575 | A1 | | 7/2004 | Zhu et al. |
| 2005/0022586 | A1 | | 2/2005 | Hu et al. |
| 2005/0046985 | A1 | | 3/2005 | Morinaga et al. |
| 2005/0068660 | A1 | | 3/2005 | Braunstein et al. |

OTHER PUBLICATIONS

IEEE Standard Dictionary of Electrical and Electronics, IEEE Std 100-1996 p. 277-278.*

* cited by examiner

*Primary Examiner* — K. Wong

(57) ABSTRACT

A low flying slider detector is disclosed. In one embodiment a surface is provided. In addition, a suspender is provided for receiving and flying a slider above the surface. A detector is also provided for detecting a low flying slider flying above the surface wherein the detector does not require measuring of the slider fly height to detect the low flying slider and wherein the detecting of the low flying slider is performed at least at a slider level of assembly.

20 Claims, 6 Drawing Sheets

APPARATUS AND METHOD FOR DETECTING LOW FLYING SLIDERS

TECHNICAL FIELD

This invention relates generally to the field of direct access storage devices and in particular to an apparatus and method for detecting low flying sliders.

BACKGROUND ART

Direct access storage devices (DASD) have become part of every day life, and as such, expectations and demands continually increase for greater speed for manipulating and holding larger amounts of data. To meet these demands for increased performance, the mechanical assembly in a DASD device, specifically the Hard Disk Drive (HDD) has undergone many changes.

In order for an HDD to hold more data, advances in the magnetic recording heads as well as the disk media on which the data is written have undergone major advances in the past few years. A critical relationship between the head and disk is the spacing between their adjacent surfaces. This is typically known as the fly height.

The head flies above the disk by virtue of an air film created by the disk spinning next to a pattern on the surface of the slider (and magnetic recording head contained there within). This pattern on the slider is known as the Air Bearing Surface, or ABS. The ABS is fabricated on the surface of the slider that is closest to the disk. Typically the closest point on the ABS to the adjacent disk surface resides on the magnetic recording head. Typically the head resides at the end of the slider known as the trailing edge of the slider, so called the trailing edge because it is the last edge of the slider to fly over the disk.

Control of the fly height is critical to the density of data that can be written onto the disk surface. Fly height today is in the range of 5-15 nm. If heads fly too high, data might not be transferred to and from the disk with adequate amplitude, or signal strength. If heads fly too low, there exists the potential for catastrophic failure known as head crash. As the name implies, head crash is that situation in which the head makes contact with the disk. This can result in either damage to the head, or to the disk, or to both. A head crash can result in loss of data and/or rendering the HDD inoperable.

As with any manufactured assembly, there are many tolerances and dimensions that affect the fly height of the head above the disk. One solution to low flying sliders is to tighten the tolerances and distributions of those features of all components that effect fly height. However, many of the tolerances are associated with components that support the head or the disk and are very difficult and costly to control for the head manufacturer or disk manufacturer. Moreover, in many cases it is possible to have each distinct component that affects fly height in an HDD meet its individual dimension and tolerance, but when assembled with other components the resulting fly height of one or more sliders is unacceptable due to the interaction of tolerances. Conversely, many components scrapped for failing to meet the component specifications, may not fail the final HDD test if the components are properly matched during assembly. Therefore, screening components based on component specifications in most cases is very costly and may not be very effective.

A second solution for addressing fly height discrepancies is the utilization of testers that can test for potentially low fly height. The primary testers available are "Fly Height Tester" (FHT) and "Dynamic Electric Tester" (DET). FHT is typically an apparatus that is custom built to suit the needs of a particular company. The DET is a marketed apparatus that measure the magnetic performance of a head flying over a spinning disk. Both the FHT and DET can be used to derive a value, usually in nanometers (nm) of the fly height of an individual slider.

For example, FHT produces an actual fly height measurement based on interference fringes, which result from reflecting light off the ABS and the disk surface above which the slider is flying. The DET infers fly height from the magnetic performance and amplitude of a head during track following. Both testers require complex and costly support hardware such as optics systems, servo devices, electronics and/or precision tooling.

Another problem with FHT and DET testing is cost. The high cost of an FHT and DET make 100% testing of all produced HGAs (and sliders) costly and most of the time impractical. To this end, fly height testing is typically performed on a sample basis.

What is needed in the HDD industry is means to quickly and economically detect, at the slider level, sliders that are prone to low flying.

SUMMARY OF THE INVENTION

A low flying slider detector is disclosed. In one embodiment a surface is provided. In addition, a suspender is provided for receiving and flying a slider above the surface. A detector is also provided for detecting a low flying slider flying above the surface wherein the detector does not require measuring of the slider fly height to detect the low flying slider and wherein the detecting of the low flying slider is performed at least at a slider level of assembly.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The apparatus and method described herein are used to detect sliders that are prone to low flying before they are assembled into a head gimbal assembly (HGA) or hard disk drive (HDD). In general, the detection techniques involve creating a condition that reduces the clearance between a slider and a surface and monitoring for contact between the slider and the surface as the slider flies over the surface. The detection is performed via various techniques such as, but not limited to, those described herein.

Additionally, the methods described herein detect sliders that are prone to flying too low under stressful operating conditions of the HDD. Stressful operating conditions of the HDD can include, but are not limited to, operating at high altitude; operating at high environmental temperature; and writing operations.

The discussion will begin with a discussion of the distribution of a slider fly height population, followed by an overview of a hard disk drive (HDD), and components connected therewith. The discussion will then focus on physical descriptions of the methods embodied in the present invention of a low flying slider detector. The operation of the embodiments of the present invention for detecting and sorting low flying sliders prior to assembly in an HDD will be discussed as well as methods for detecting and sorting low flying sliders assembled in an HDD.

Overview

Figure 1:
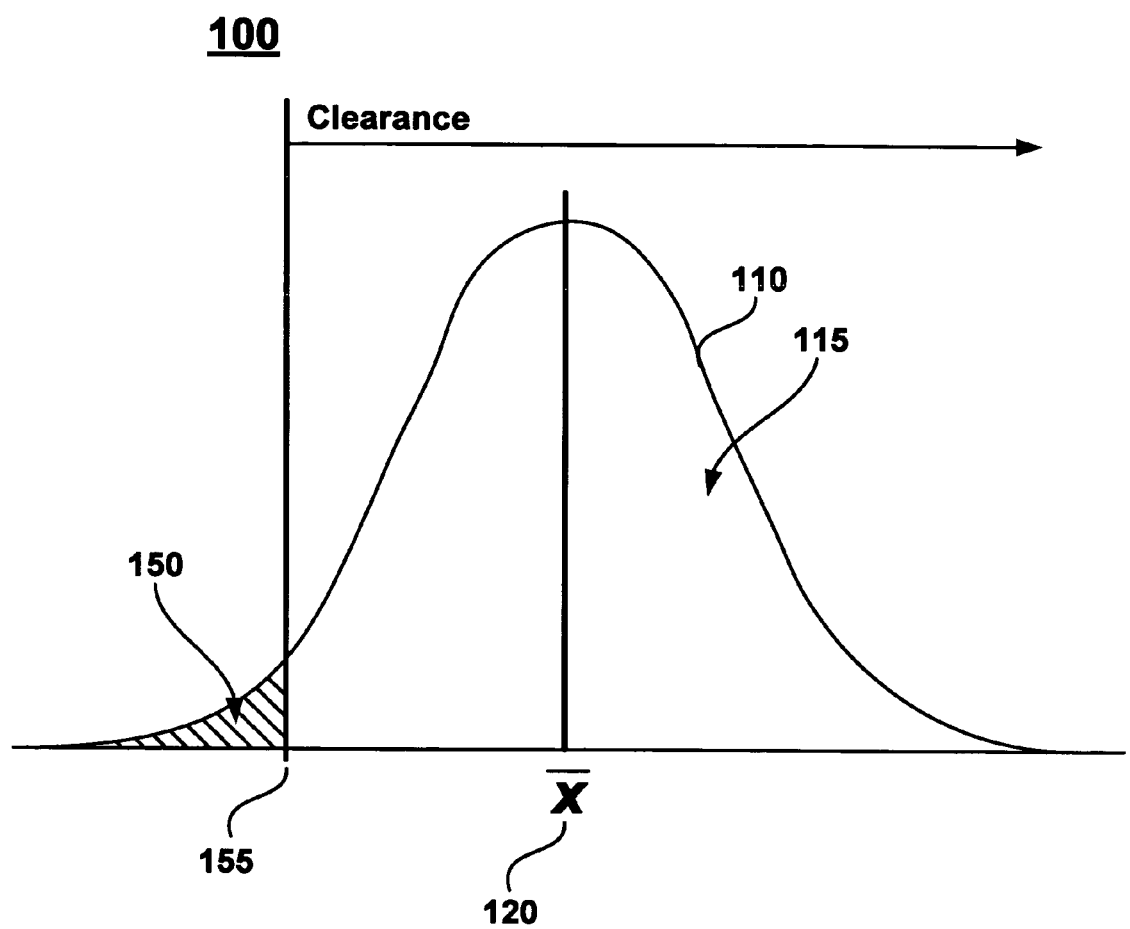
FIG. 1 is a distribution chart of a fly height population being controlled in accordance with one embodiment of the present invention.

Referring to FIG. 1, a distribution chart 100 is presented of a fly height population of sliders. The mean fly height 120 of the population, statistically known as X-bar, is the average of all fly heights 350 (FIG. 3) of the population of sliders. Plotting all fly heights in the population yields a distribution 110. Those sliders in clearance population 115 will not jeopardize the HDD with a potential head crash. However, the sliders in the low flying height population 150 may jeopardize the HDD with a potential head crash.

For example, the value for low fly height 155 is chosen to coincide with that fly height that a slider may experience during operation in the previously described stressful HDD operating conditions. In many cases, the shape of distribution 110 may change from population to population as well as with level of assembly, e.g. slider level to HGA level to HDD level. Truncating the low fly height population 150 from distribution 110 prevents a low flying slider from being assembled into an HGA and ultimately a hard disk drive.

In one embodiment, the detection of sliders in the low fly height population 150 is performed before expending assembly costs on higher levels of assembly, e.g. HGA and HDD. In other words, detecting and sorting sliders in low fly height population 150 prior to HGA or HDD assembly avoids unnecessary manufacturing expenditures and costs. However, in another embodiment, the low flying slider detection can be performed at the HGA level of assembly. In yet another embodiment, the low flying slider detection can be performed at the HDD level of assembly.

Importantly, unlike prior art low flying slider detection methods, the embodiments described herein are capable of detecting the low flying slider without actually knowing or measuring the fly height of the slider. As described herein, the detector will detect contact or no contact in detecting fly height. Additionally, since the testing can be performed at many levels of slider assembly, the testing can be performed without the complete electronics read and write package (e.g., fast, low noise, etc.) installed. Instead, only a write current (e.g., low frequency or even DC) is needed and TA measurement can be read back in low frequency. Furthermore, in one embodiment, based on the level of slider assembly being tested, a precision servo system is not required. That is, the slider need only be moved roughly above the surface having bumps, or roughly away from the surface having bumps during the detecting process.

Figure 2:
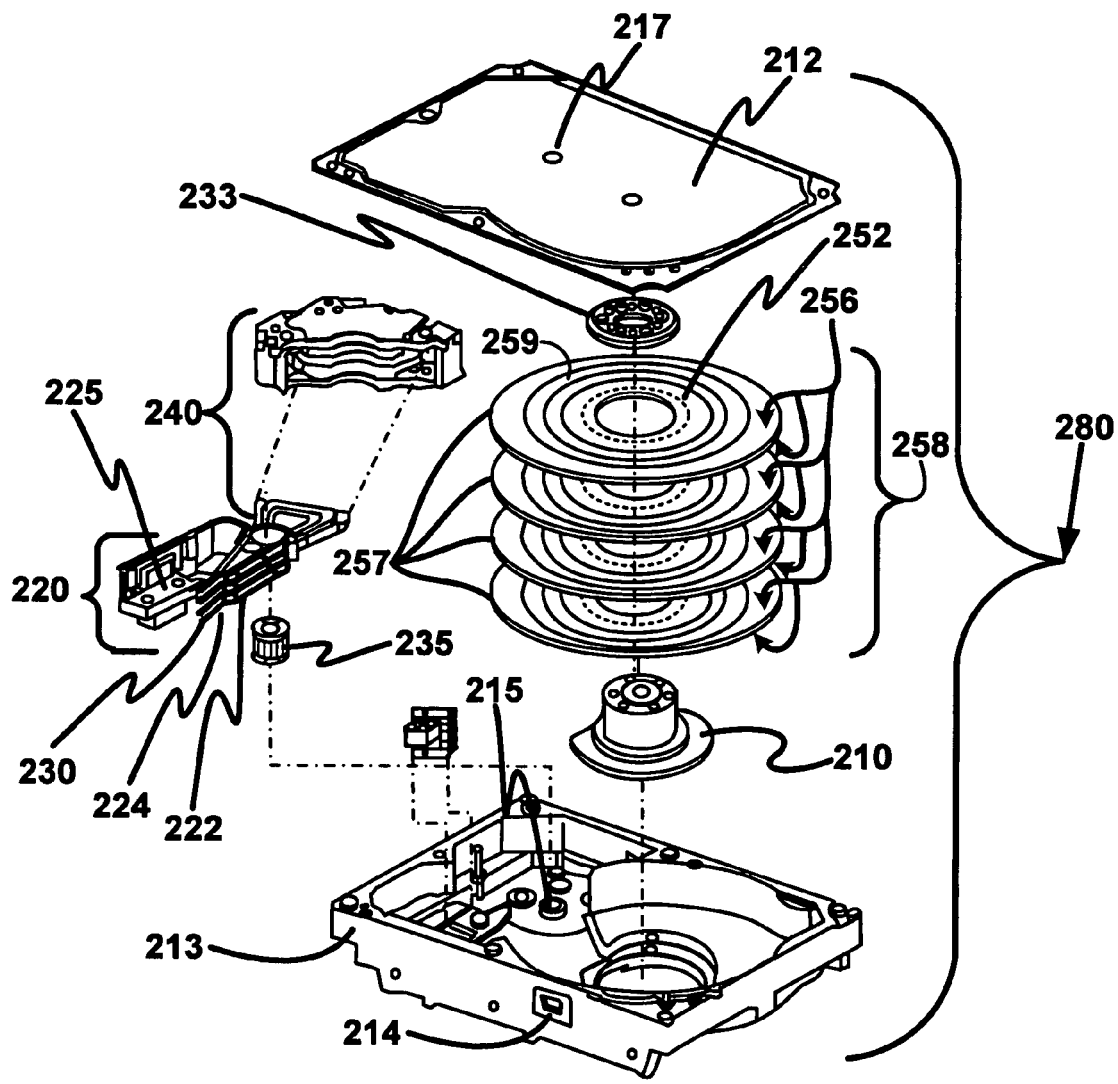
FIG. 2 is a perspective exploded view of an HDD in accordance with one embodiment of the present invention.

With reference now to FIG. 2, a perspective exploded view of an HDD is shown in accordance with one embodiment of the present invention. FIG. 2 illustrates the relationship of components and sub-assemblies of HDD 280 and a representation of data tracks 259 recorded on surface 256. The components are assembled into base casting 213, which provides attachment and registration points for components and sub-assemblies.

Data is recorded onto surface 256 in a pattern of concentric rings known as data tracks 259. Actuator assembly 220, in conjunction with Voice Coil Motor (VCM) 240, position slider 230 over surface 256. Typically there are two surface 256 per disk 257. At least one disk 257 is assembled into a disk pack 258 and spun at high speed by means of motor-hub assembly 210. Data tracks 259 are recorded onto surface 256 by means of a magnetic recording head which typically resides at the end of slider 230.

The quantity of data recorded in data tracks 259 on surface 256 is determined partly by how close slider can fly over surface 256 without contacting surface 256. Herein, attention is given to determining whether or not a slider 230 will contact a surface 256 and possibly damage slider 230 and/or surface 256.

Figure 3:
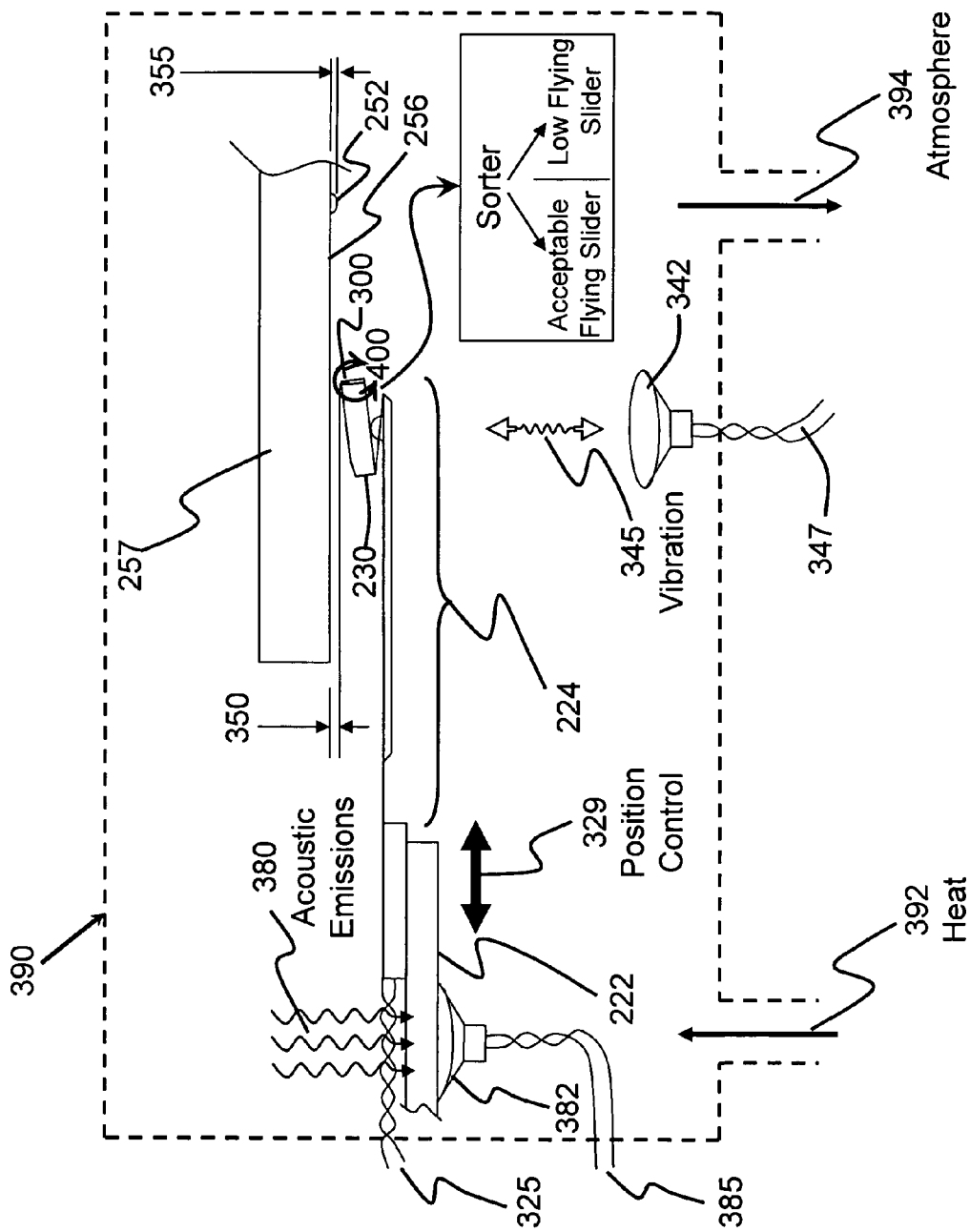
FIG. 3 is a side view of a low flying slider detector in accordance with one embodiment of the present invention.

With reference now to FIG. 3, a low flying slider detector 390 is shown in accordance with one embodiment of the present invention. In general, low flying slider detector 390 is utilized for detecting and sorting sliders with low flying characteristics. Moreover, in one embodiment, the detecting and sorting of the sliders in low flying slider detector 390 is performed prior to assembling the slider into a hard disk drive. In another embodiment, the detecting and sorting of the sliders in low flying slider detector 390 is performed prior to assembling the slider into a head gimbal assembly.

Low flying slider detector 390 includes a surface 256 and a suspender 224. Suspender 224 includes a reusable mechanism that can temporarily suspend slider 230 over surface 256 and at times temporarily electrically connect the magnetic recording head to instrumentation and control circuitry via conductors 325. In one embodiment low flying slider detector 390 also includes an interference bump 252 on a surface 256. Low flying slider detector 390 also includes an associated arm means 222. In one embodiment, arm means 222 is a tool adapted for mounting the suspender 224 in relation to disk 257. In another embodiment arm means 222 can also be part of actuator assembly 220 (FIG. 2) in HDD 280.

Low flying slider detector 390 further includes position control 329. In one embodiment, as disk 257 rotates and slider 230 flies above surface 256, position control 329 moves slider 230 over interference bump 252. Position control 329 in low flying slider detector 390 is an actuation means such as a lead screw, pneumatic actuator, or any actuation means known in the industry. In another embodiment, surface 256 can be positioned over slider 230 instead of slider 230 being positioned above surface 256. In yet another embodiment, position control 329 in HDD 280 can be VCM 240.

Surface 256 can include a disk intended for use in an HDD or a disk of a diameter different from the disk intended for use in an HDD. Such a disk of a different diameter can be spun at a speed to produce an appropriate linear velocity, which allows slider 230 to fly at its intended fly height 350 in an HDD.

In one embodiment, surface 256 may not need to be rotated, as with a disk, to produce an appropriate linear velocity. For example, appropriate linear velocity of surface 256 can be achieved by other means such as moving a surface of a tape, belt or drum. The item that includes surface 256 is not meant to limit the scope of this invention but is provided herein merely for purposes of brevity and clarity.

In another embodiment, low flying detector 390 introduces Heat 392, which increases the operating temperature inside low flying detector 390. In yet another embodiment Atmosphere 394 is taken from low flying detector 390 thereby reducing the operating atmospheric pressure inside low flying detector 390.

In one embodiment, low flying detector 390 includes acoustic emission detector 382 for detecting Acoustic Emissions 380 that result from contact of slider 230 with surface 256. Signals from acoustic emission detector 382 are transmitted to instrumentation via connector 385. In another embodiment, low flying detector 390 includes vibration detector 342 for detecting Vibration 345 that result from contact of slider 230 with surface 256. Signals from vibration detector 342 are transmitted to instrumentation via connector 347. In one embodiment, the vibration detector is a Laser Doppler Velocimetry (LDV) described in further detail herein.

Figure 4:
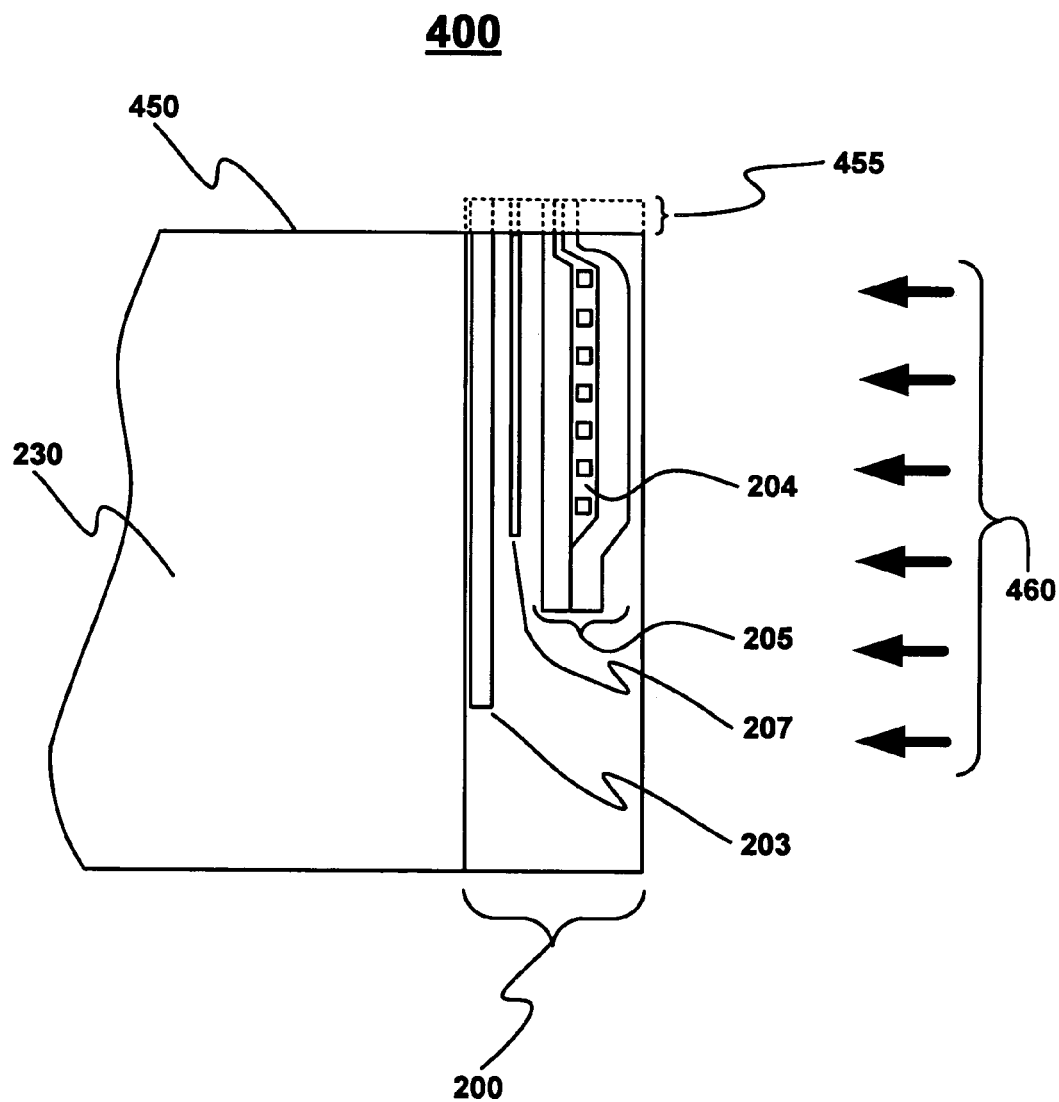
FIG. 4 is a detail cross-section view of a magnetic recording head in accordance with one embodiment of the present invention.

With reference to FIG. 4, a detail cross-section view 400 of magnetic recording head 200, which typically resides at the trailing end of slider 230, is shown. Cross-section view 400 reveals some of the major components that are included in magnetic recording head 200. Thermal Fly-height Control (TFC) 203 is typically used for controlling fly height 350 of magnetic recording head 200 to optimize the performance of MR/GMR read element 207. TFC 203 controls fly height by heating magnetic recording head 200, which results in protrusion 455. In an embodiment of the present invention, low fly height detector 390 uses TFC 203 to reduce fly height 350 by an amount that coincides to the loss in fly height that can result from stressful HDD operating conditions. This loss in fly height is equal to the height of protrusion 455, which is controlled by TFC 203.

In another embodiment, low fly height detector 390 uses coil 204 of inductive write head element 205 to produce a similar protrusion 455 through heating. Given a sufficient amount of current passing through coil 204, heat is generated in magnetic recording head 200. The resulting protrusion 455 will reduce fly height 350 by an amount that coincides to the loss in fly height that can result from stressful HDD operating conditions.

In yet another embodiment, low fly height detector 390 uses Heat 460 directed at the magnetic recording head 200 to produce a similar protrusion 455. Given sufficient heat, protrusion 455 will reduce fly height 350 by an amount that coincides to the loss in fly height that can result from stressful HDD operating conditions. With all embodiments that introduce heat to magnetic recording head 200, protrusion 455 typically protrudes beyond ABS 450 and closer to surface 256.

Physical Description

In with an embodiment of the present invention and in reference to FIG. 3, the clearance between slider 230 and surface 256 can be controlled to simulate low flying characteristics of slider 230 by providing disk 257 with interference bump 252 on surface 256. The height 355 of interference bump 252 is chosen to coincide with the loss in fly height that can result from stressful HDD operating conditions. Slider 230 will contact interference bump 252 if slider 230 is flying at or below height 355.

Interference bump 252 is created for example by a laser process well known in the disk industry. The method of creating interference bumps does not limit the scope or breadth of the embodiment of the present invention. Typically the location of interference bump 252 is at the inner diameter of disk 257, outside the perimeter of disk clamp means 233 (FIG. 2).

By decreasing the clearance between slider 230 and surface 256 with interference bump 252, low flying sliders will fly even closer to the interference bump 252 resulting in slider to interference bump interference. This interference will be detected utilizing methods described herein. Sliders that provide a recognized interference will be sorted as low flying sliders.

In accordance with an alternate embodiment, slider 230 can be controlled to fly low by withdrawing atmosphere 394 from low flying slider detector 390 thus directly reducing the operating atmospheric pressure for low flying slider detector 390. Withdrawing atmosphere 394 usually decreases the density and pressure of the atmosphere that allows ABS 450 to lift slider 230 above surface 256. A less dense atmosphere will typically cause slider 230 to fly closer to surface 256.

In accordance with another embodiment, a less dense atmosphere can also be achieved by choosing a less dense gas to include the atmosphere inside low flying slider detector 390, for example helium or hydrogen gas. Similarly, and in accordance with another embodiment of the present invention, a less dense gas such as helium or hydrogen can be injected locally around slider 230 to cause slider 230 to fly closer to surface 256.

By controlling the operating atmospheric pressure or density, fly height 350 is reduced by an amount that coincides to the loss in fly height that may result from stressful HDD operating conditions. By decreasing the fly height, low flying sliders will fly even closer to the surface resulting in slider to surface interference. This interference will be detected utilizing methods described herein. Sliders that provide a recognized interference will be sorted as low flying sliders.

In accordance with an alternate embodiment, Heat 392 is injected into low flying slider detector 390. Heat 392 can typically control slider 230 to fly low by two phenomena resulting from heat. Firstly, as temperature increases in low flying slider detector 390, the density of the operating atmosphere inside low flying slider detector 390 decreases which in turn decreases fly height 350 of slider 230. Secondly, the injection of Heat 392 increases the temperature of slider 230 and its associated magnetic recording head 200. Heating causes a protrusion 455 (FIG. 4) of magnetic recording head 200 to extend beyond ABS 450 and hence decreases fly height 350. In one embodiment, heat can be applied by placing the slider, the slider assembly or the entire HDD assembly in a temperature controlled chamber.

In another embodiment and with reference to FIG. 4, direct heating of magnetic recording head 200 can be accomplished to control slider 230 to fly low. Heat 460 can be directed at magnetic recording head 200 by means of a focused IR (infrared) beam or a laser beam, both techniques well known in industry. In another embodiment, Heat 460 can be directed at magnetic recording head 200 inside HDD 280 by means of a laser or focused IR beam through an appropriate hole such as hole 214 in base casting 213. In yet another embodiment, direct heating can also be accomplished by utilizing elements of magnetic recording head 200 that are usually present.

For example, inductive write head element 205 writes data to a disk surface by means of a current passed through coil 204, shown in cross-section as rectangles in FIG. 2. Coil 204 is part of inductive write head element 205. While the typical amount of current used for writing data will not cause an appreciable protrusion 455. Excessive amounts of current beyond that required for writing data can cause protrusion 455 to protrude appreciably beyond ABS 450. The amount of current passed through coil 204 has a direct relationship to the height of protrusion 455 beyond ABS 450.

A similar direct heating can result by utilizing Thermal Fly-height Control (TFC) element 203. As with coil 204, TFC element 203 will produce protrusion 455 in direct relationship to the amount of current passed through TFC element 203. In low flying slider detector 390, electrical connection to coil 204 and TFC element 203 can be accomplished via conductors 325. It should be appreciated and understood that other elements of head 200 can be contrived to serve the purpose of heating head 200.

By heating magnetic recording head 200, fly height 350 is reduced by an amount that coincides to the loss in fly height that may result from stressful HDD operating conditions. This loss in fly height is equal to the height of protrusion 455. By decreasing the fly height, low flying sliders will fly even closer to the surface resulting in slider to surface interference. This interference will be detected utilizing methods described herein. Sliders that provide a recognized interference will be sorted as low flying sliders.

The fly height of slider 230 can be controlled when slider 230 is assembled into HDD 280 and/or actuator assembly 220. Electrical connections to coil 204 and TFC 203 are typically conveniently available through connector 225. Electrical connection via connector 225 is only exemplary of how electrical connection to coil 204 and TFC 203 and is discussed merely for purposes of brevity and clarity.

In summary, low flying characteristics of a slider can be simulated by providing a surface with a bump that will interfere with the slider when it flies at or below the height of the bump. Heat can be used to control fly height. Inductive write head element 205, MR/GMR read element 207, and TFC element 203, all being contained in protrusion 455, can be pushed beyond ABS 450 when heat is introduced, and thus control the fly height of slider 230. Changing the density of the operating atmosphere, thus changing the ability of the ABS to lift the slider above the surface, can control the fly height of the slider.

The previous discussions have addressed the various embodiments of the present invention for controlling the fly height of slider 230. The following discussion presents the embodiments of the present invention for detecting a low flying slider. Reference is made to low flying slider detector 390 (FIG. 3) for application of the following group of detection methods. It is inferred that the following group of detection methods can also be applied to HDD 280 (FIG. 2).

When a low flying slider contacts surface 256, a vibration is produced, which can be measured with an acoustic emission detector 382 attached to a portion of the HGA holder, such as arm 222 or suspender 224. Acoustic emission detector 382 can detect acoustic emissions 380 and send these signals through connector 385 for analysis. Analysis of the signals from acoustic emission detector 382 will determine if acoustic emissions 380 are the result of contact being made by a low flying slider and surface 256.

Another exemplary method for detecting slider-surface contact is a Laser Doppler Velocimetry (LDV), which measures vibration 345 with reflected laser light. Hole 214 in base casting 213 is an example of an appropriate point of access for an LDV to measure vibration 345 in an HDD. The location and examples of vibration detector 342 are exemplary and only presented for discussion.

When a low flying slider contacts surface 256 a phenomenon known in the art as a thermal asperity will result. The term "asperity" comes from the small perturbation on surface 256 that can make contact with MR/GMR read element 207. The term "thermal" comes from the rise in temperature experienced when MR/GMR read element 207 hits an asperity. A thermal asperity is a sudden rise in the read signal from MR/GMR read element 207. The sudden rise in the read signal usually occurs when contact is made between surface 256 (or interference bump 252) and MR/GMR read element 207.

The application of thermal asperity detection in low flying slider detector 390, utilizes conductors 325 to carry the read signal from head 200 to equipment for analysis. The application of thermal asperity detection in HDD 280, typically utilizes connector 225 to carry the read signal from head 200 to equipment for analysis. In yet another embodiment, when testing is performed on the complete HDD assembly, the position error signals (PES) of the servo system can be used to detect contact between slider 230 and surface 256. For example, when surface-slider contact occurs the PES of the servo system will increase.

Operation

Figure 5:
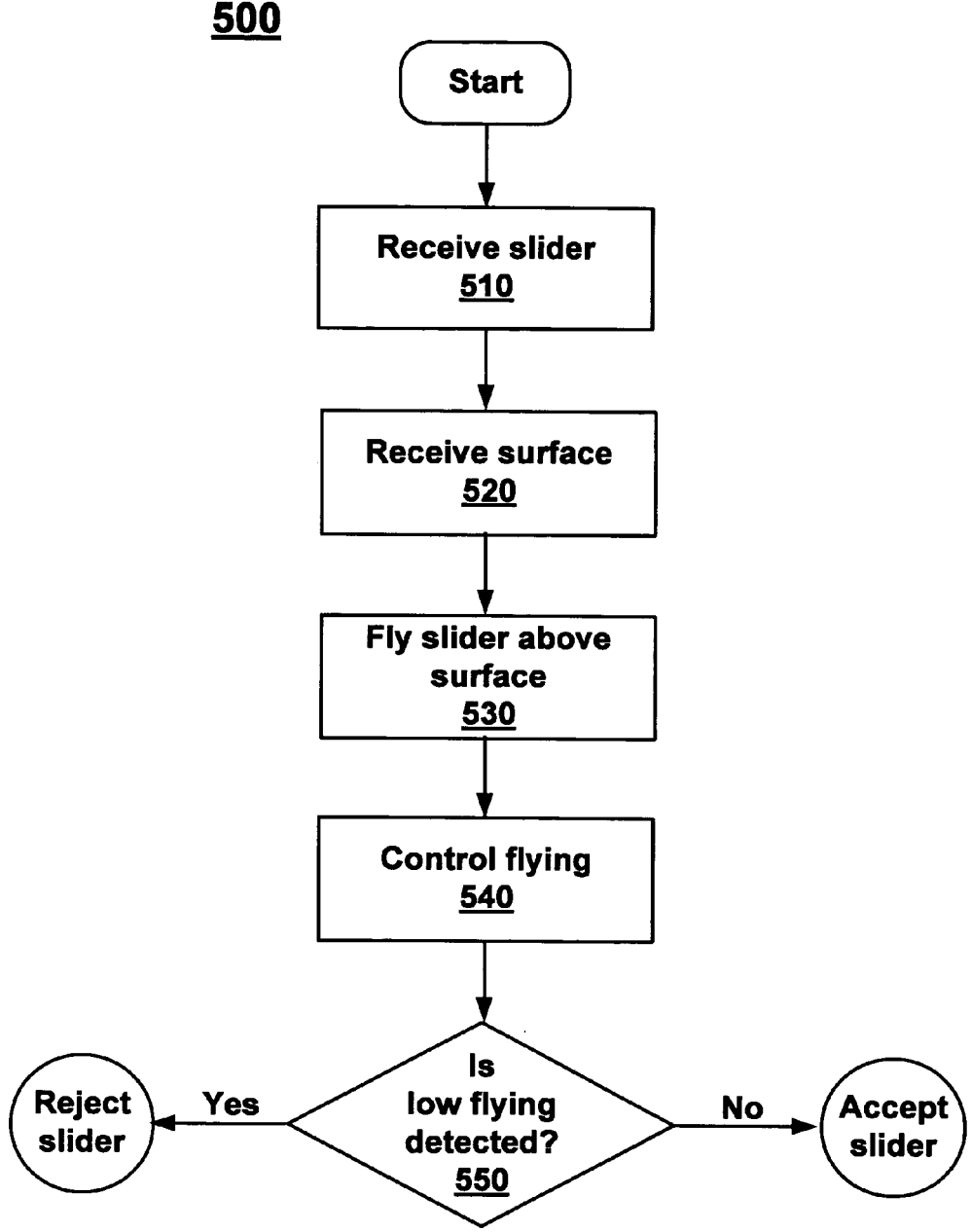
FIG. 5 is a flowchart illustrating the steps for detecting a low flying slider in accordance with one embodiment of the present invention.

With reference now to FIG. 5, a flowchart 500 of a method for detecting and sorting a slider with low flying characteristics is shown in accordance with one embodiment of the present invention. In general, flowchart 500 includes processes that may be carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium.

Although specific processes are disclosed in flowchart 500, such processes are exemplary. That is, the present invention is well suited to performing various other processes or variations of the processes recited in FIG. 5. Within the present embodiment, it should be appreciated that the processes of flowchart 500 may be performed by software, by hardware, by an assembly mechanism, through human interaction, or by any combination of software, hardware, assembly mechanism, and human interaction.

Referring now to 510 of flowchart 500 and to FIG. 3, in one embodiment, a slider 230 is received. 510 may have one of several alternative embodiments. In one embodiment, slider 230 may be received as an individual slider. Examples of means for receiving individual sliders are a process container or a diced array of sliders on transfer tap. Means for receiving individual sliders may reside inside or outside low flying slider detector 390. In another embodiment, slider 230 may be received in an HGA, which may be received in a process container, inside or outside low flying slider detector 390. In another embodiment, slider 230 may be received in an actuator assembly 220, which may be received in a process container, inside or outside low flying slider detector 390. In yet another embodiment, slider 120 may be received in the form of a complete HDD assembly.

Referring now to 520 of flowchart 500 and to FIG. 3, in one embodiment surface 256 is received. 520 may have one of several alternative embodiments. In one embodiment, surface 256 may be received comprising interference bump 252. Additionally, surface 256 may be received comprising disk 257. In another embodiment, surface 256 may be received comprising the appropriate linear velocity for the intended hard disk drive. In yet another embodiment, surface 256 is received as the disk 257 in the complete HDD assembly.

Referring now to 530 of flowchart 500 and to FIG. 3, slider 230 is flown above surface 256. In one embodiment, flying slider 230 above surface 256 includes suspender 224 comprising a reusable mechanism that can temporarily suspend slider 230 above surface 256 and at times temporarily electrically connect magnetic recording head 200 to instrumentation via conductors 325. In another embodiment, flying slider 230 above surface 256 includes suspending slider 230 above surface 256 using an HGA suspender 224.

Referring now to 540 of flowchart 500 and to FIGS. 1 and 3, the flying of slider 230 over surface 256 is controlled such that the fly height is at low fly height 155, towards the lower limit of acceptable flying. In one embodiment fly height 350 may be controlled to low fly height 155 by Position Control 329 moving slider 230 above interference bump 252. Conversely, interference bump 252 may be moved under slider 230. Additionally, fly height 350 may be controlled to low fly height 155 by reducing operating pressure, by providing thermal changes such as raising the temperature around the slider 230, or directly heating slider 230.

Referring now to 550 of flowchart 500 and to FIG. 3, in one embodiment, a detection method includes but is not limited to acoustic emission, thermal asperity read signal, and/or vibration for detecting if slider 230 contacts surface 256, and thermal asperity measurements. If no contact is detected, then slider 230 is not a low flying slider. Thus, slider 230 is accepted and proceeds to the next step of assembly. However, if contact is detected, then slider 230 is classified as a low flying slider. Moreover, slider 230 is sorted before proceeding to the next step of assembly.

Figure 6:
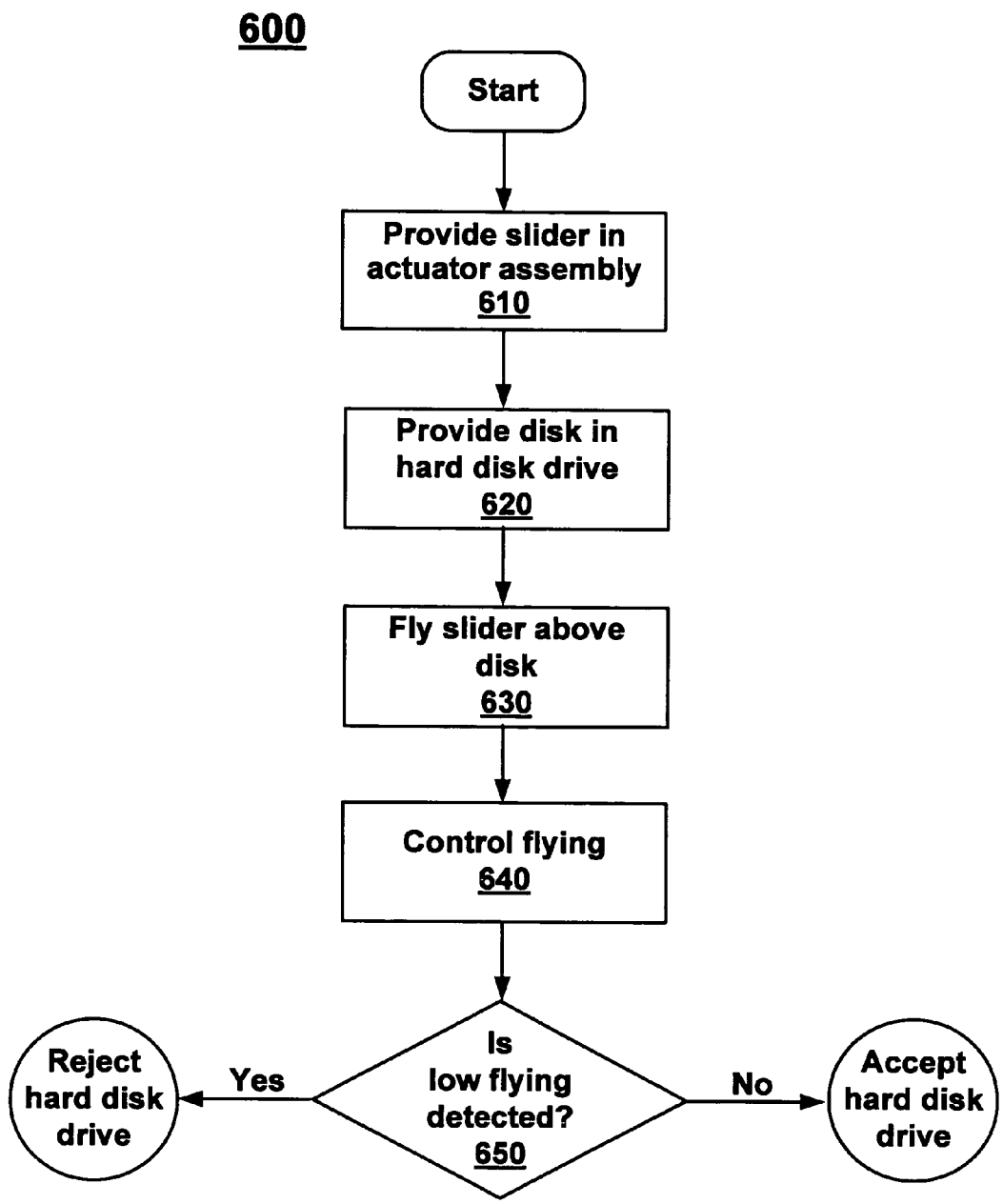
FIG. 6 is a flowchart illustrating the steps for detecting a low flying slider in an HDD in accordance with one embodiment of the present invention.

With reference now to FIG. 6, a flowchart 600 of a method for detecting and sorting a slider with low flying characteristics in an HDD is shown in accordance with one embodiment of the present invention. In general, flowchart 600 includes processes that may be carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium.

Although specific processes are disclosed in flowchart 600, such processes are exemplary. That is, the present invention is well suited to performing various other processes or variations of the processes recited in FIG. 6. Within the present embodiment, it should be appreciated that the processes of flowchart 600 may be performed by software, by hardware, by an assembly mechanism, through human interaction, or by any combination of software, hardware, assembly mechanism, and human interaction.

Referring now to 610 of flowchart 600 and to FIG. 2, slider 230 is received as part of actuator assembly 220.

Referring now to 620 of flowchart 600 and to FIG. 2, in one embodiment surface 256 is received as part of a disk 257 in disk pack 258. Surface 256 may be received comprising interference bump 252.

Referring now to 630 of flowchart 600, slider 230 is flown above surface 256 by rotating disk pack 258 via motor-hub assembly 210.

Referring now to 640 of flowchart 600 and to FIGS. 1 and 2, the flying of slider 230 over surface 256 is controlled such that the fly height is at low fly height 155, towards the lower limit of acceptable flying. Controlling fly height 350 at low fly height 155 includes one of several alternative embodiments. In one embodiment fly height 350 may be controlled to low fly height 155 by using VCM 240 to position slider 230 above interference bump 252. In another embodiment, fly height 350 may be controlled to low fly height 155 by reducing operating pressure for HDD 280. In another embodiment, fly height 350 may be controlled to low fly height 155 by thermal fly height control 203. In another embodiment, fly height 350 may be controlled to low fly height 155 by heating slider 230.

Referring now to 650 of flowchart 500 and to FIG. 3, a detection method includes but is not limited to acoustic emission, thermal asperity read signal, and/or vibration for detecting if slider 230 is flying low and contacting surface 256. If no contact is detected, then slider 230 is not a low flying slider, and HDD 280 is accepted for proceeding to the next step of assembly. Moreover, if slider 230 is a low flying slider, HDD 280 is rejected for proceeding to the next step of assembly.

Therefore, unlike prior art low flying slider detection methods, the embodiments described herein are capable of detecting the low flying slider without actually knowing or measuring the fly height of the slider. In other words, the detector will either detect contact or not detect contact during the fly operation of a slider.

Additionally, since the testing can be performed at many levels of slider assembly, the testing can be performed without the complete electronics read and write package (e.g., fast, low noise, etc.) installed. Instead, only a write current (e.g., low frequency or even DC) is needed and TA measurement can be read back in low frequency.

Furthermore, based on the level of slider assembly being tested, a precision servo system is not required. That is, an imprecise slider moving method is acceptable since the slider need only be moved roughly above the surface having bumps, or roughly away from the surface having bumps during the low fly height detecting process.

Thus, embodiments described herein solve the problem of spending manufacturing resources on sliders that have the potential for failing at higher levels of assembly for flying too low. The embodiments described herein solve the problem of being able to detect in a non-measured, fast and inexpensive manner, all sliders that have the potential of flying too low at a plurality of assembly levels. Advantageously, the present invention, in the various embodiments further provides increased reliability to an HDD.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A low flying slider detector comprising:
a surface;

a suspender for suspending and flying a slider above said surface;

a detector for detecting a low flying said slider flying above said surface wherein said detector does not require measuring of said slider fly height to detect said low flying slider and wherein said detecting of said low flying slider is performed at least at a slider level of assembly, wherein said flying said slider above said surface comprises controlling the fly height of said slider, and wherein said controlling said fly height comprises reducing operating atmospheric pressure for said low flying slider detector.

2. The low flying slider detector of claim 1 further comprising:

a sorter for sorting said slider according to said low flying.

3. The low flying slider detector of claim 1 wherein said suspender comprises a reusable mechanism for temporarily suspending said slider above said surface.

4. The low flying slider detector of claim 1 wherein said detecting of said low flying slider is performed at a head gimbal assembly (HGA) level of assembly.

5. The low flying slider detector of claim 1 wherein said detecting of said low flying slider is performed at a hard disk drive (HDD) level of assembly.

6. The low flying slider detector of claim 1 wherein said flying said slider above said surface comprises moving said surface at intended linear velocity of a disk in said hard disk drive.

7. The low flying slider detector of claim 1 wherein said surface has at least one interference bump thereon.

8. The low flying slider detector of claim 1 wherein said controlling said fly height comprises thermal fly height control.

9. The low flying slider detector of claim 1 wherein said controlling said fly height comprises heating said slider.

10. The low flying slider detector of claim 1 wherein said controlling said fly height comprises moving said slider above said surface having at least one interference bump thereon, wherein said moving of said slider is capable of being performed by an imprecise servo system.

11. The low flying slider detector of claim 1 wherein said controlling flying of said slider above said surface comprises moving at least one interference bump on said surface under said slider.

12. The low flying slider detector of claim 1 wherein said detecting said low flying slider utilizes a detection method from the group of detection methods consisting of:
acoustic emission;
thermal asperity read signal; and
vibration of said slider.

13. A method for detecting and sorting a slider with low flying characteristics comprising:
receiving a slider suitable for functioning in a hard disk drive;
receiving a surface;
flying said slider above said surface;
controlling flying of said slider above said surface, said controlling comprising reducing operating atmospheric pressure with respect to said slider and said surface;
detecting said low flying, wherein said detecting does not require measuring of said slider fly height to detect said low flying slider and wherein said detecting of said low flying slider is performed at least at a slider level of assembly; and
sorting said slider according to low flying.

14. The method of claim 13 further comprising:
utilizing a temporary reusable suspender for flying said slider above said surface.

15. The method of claim 13 further comprising:
performing said detecting at a head gimbal assembly level of assembly.

16. The method of claim 13 further comprising:
performing said detecting at a hard disk drive level of assembly.

17. The method of claim 13 wherein said surface further comprises:
providing at least one interference bump on said surface.

18. The method of claim 13 wherein said controlling comprises:
increasing atmospheric temperature between said slider and said surface to reduce said fly height.

19. The method of claim 13 wherein said controlling comprises:
heating at least one portion of said slider.

20. The method of claim 13 wherein said detecting said low flying slider utilizes a detection method from the group of detection methods consisting of:
acoustic emission;
thermal asperity read signal; and
vibration of said slider.

* * * * *